United States Patent Office 2,786,016
Patented Mar. 19, 1957

2,786,016

STABILIZATION OF CRACKED GASOLINES WITH BORONTRIFLUORIDE PROMOTED BY SULFURIC ACID

Eldon M. Sutphin, Penn Township, Allegheny County, Pa., assignor to Gulf Research & Development Company, Pittsburgh, Pa., a corporation of Delaware No Drawing. Application May 5, 1954,
Serial No. 427,857

6 Claims. (Cl. 196—23)

This invention relates to a process for treating hydrocarbons and more particularly to a process for improving the stability of cracked gasolines.

Gasolines prepared by either thermal or catalytic cracking of hydrocarbon oils are unstable, as indicated by the formation of gum when the gasoline is stored for long periods. The gum is objectionable in causing deposits which impair the operation of internal combustion engines. Gum formation in gasoline is probably caused by several reactions taking place during the storage period. It has been suggested that the formation of gum is accelerated by the presence of compounds containing elements in addition to carbon and hydrogen, and particularly oxygen- or sulfur-containing compounds, in the gasoline. It is probable that at least a part of the gum is caused by the polymerization of olefinic, diolefinic or other unsaturated hydrocarbons. The gum forming compounds are usually concentrated in the heavy fractions of the gasoline. Undercutting of cracked gasolines to reduce the amount of heavy fractions present will cause a marked improvement in the stability of the gasoline, but, of course, also results in a decreased yield of gasoline.

It has been the general practice to treat cracked gasolines with concentrated sulfuric acid in amounts of about 10 pounds or more of sulfuric acid per barrel of gasoline. That treatment results in the formation of a sludge, the disposal of which is a difficult problem. In addition, the increased acidity resulting from the treatment with sulfuric acid increases the corrosion of metals in distillation equipment, for example, by the gasoline. Sulfuric acid treatment of cracked gasolines usually causes substantial yield losses and reduction of octane number, which makes another method of treatment of the gasoline to improve the stability desirable, even though the treatment with sulfuric acid is an effective means of improving the stability of the gasoline.

According to this invention, cracked gasolines are treated with boron trifluoride promoted with small amounts of sulfuric acid or sulfur trioxide to improve the stability of the gasoline.

The cracked gasoline to be treated is mixed with boron trifluoride and a promoter in any batch or continuous reactor equipped with suitable mixing apparatus, such as mechanical agitators or orifice type mixers, to provide thorough contact of the gasoline with the promoted boron trifluoride. The boron trifluoride and promoter may be added directly to the gasoline to be treated in separate streams or may be mixed together and then added to the cracked gasoline. Either or both of the boron trifluoride and promoter can be added to the cracked gasoline in the reactor or prior to charging to the reactor, as long as effective concentrations of both promoter and boron trifluoride are in contact with the gasoline simultaneously during the treatment.

The stabilization reaction proceeds rapidly to substantial completion. No difference in the results of treating were determined in experimental runs, even though the period of mixing the promoted boron trifluoride with the gasoline was varied from one to ten minutes. The treating reaction is not sensitive to temperature; hence, it is preferably performed at substantially atmospheric temperature or at the temperature of the gasoline available for treatment in order to avoid the expense of heating or cooling the gasoline. Experimental work has indicated that varying the temperature of the reactor from room temperature to 300° F. results in little change in the characteristics of the treated gasoline.

The amount of boron trifluoride employed in the treatment will vary with the type of gasoline being treated. In general, heavy fluid catalytically cracked gasolines are more difficult to stabilize than heavy thermal gasolines and will require larger quantities of boron trifluoride. Gasolines from fixed bed and moving bed catalytic cracking processes usually fall between the fluid catalytic gasoline and the thermal gasoline in respect to the difficulty in stabilization. The type of charge stock, in addition to the type of cracking operation, will influence the amount of boron trifluoride and promoter required. The amount of boron trifluoride will also depend upon the degree of stabilization desired. In general, approximately 0.05 percent (by weight of the charge) boron trifluoride promoted with approximately 0.05 percent (by weight of the charge) sulfur trioxide or sulfuric acid is preferred in the stabilization of heavy fluid catalytically cracked gasolines and approximately one-half of those concentrations for example, 0.03 percent $BF_3$ and 0.03 percent $SO_3$ or $H_2SO_4$, is sufficient for the stabilization of thermally cracked gasoline.

The amount of sulfuric acid or sulfur trioxide required for the promotion of the boron trifluoride will depend in part upon the amount of boron trifluoride used in the treatment. In general, the larger the amount of boron trifluoride employed, the smaller the quantity of promoter required since the promoting effect required to obtain the desired degree of stabilization is reduced; however, the amount of promoter should be at least about 0.03 percent by weight of the charge to obtain an appreciable promoting effect. The very low cost of sulfuric acid or sulfur trioxide as compared with boron trifluoride makes it desirable to use quantities of sulfuric acid sufficient to give a marked promoting effect to the boron trifluoride. Promoters in amounts of at least 0.03 percent by weight of the gasoline, and more desirably 0.05 percent, can be employed. In general, little is gained by the use of larger amounts of sulfuric acid or sulfur trioxide since the action of those compounds is as a promoter and the amounts added are of a completely different order of magnitude than the amounts used, for example, in sulfuric acid treating.

The concentration of sulfuric acid employed in the treatment is not critical. For example, spent alkylation acid consisting of approximately 87 percent sulfuric acid can be substituted for the 96 percent sulfuric acid employed in the examples described herein. Moreover, experimental data that have been obtained indicate that no measurable difference in effectiveness of treating will result if the gasoline is water washed or dried immediately prior to treating.

After the mixing of the promoted boron trifluoride for a period sufficient to obtain substantial completion of the reactions taking place in the reactor, the treated gasoline is allowed to settle, either in the reactor or a separate vessel, and the treated gasoline decanted from the residue which readily settles. Since heavy materials formed in the reactor are of at least limited solubility in the gasoline, a complete separation of the gasoline and such products cannot be made by decantation, and further separation is desirable. Conventional separation processes may be employed. For example, the treated gasoline can be washed with water to remove dissolved boron trifluoride, neutralized with caustic, and re-distilled to the desired end point. The thus treated and re-distilled gasoline can be treated in any desired manner, and will ordinarily be blended with other stocks to prepare a finished gasoline. In the preparation of commercial gasolines, a small amount of an inhibitor, ordinarily of the order of 10 pounds of inhibitor per 1000 barrels of gasoline is added to the gasoline to improve its storage characteristics. However, the process of this invention improves the storage characteristics of either inhibited or uninhibited gasolines.

The following examples illustrate the promotion effect of sulfuric acid and sulfur trioxide on boron trifluoride in the stabilization of gasolines.

EXAMPLE 1

A heavy fluid catalytically cracked gasoline having a gravity of 43.7° A. P. I. and a distillation range from 250° F. over point to 378° F. for the 90 percent point was pumped into a continuous, mechanically agitated reactor. Boron trifluoride was added directly to the reactor from a container through a line containing a meter and valve to maintain a constant rate of flow of the boron trifluoride at 0.05 percent by weight of charge. The amount of boron trifluoride added during the entire run was determined by weighing the boron trifluoride container before and after the run. The gasoline and treating agent were mixed in the reactor which was maintained at substantially room temperature. The rates of flow were adjusted to give a time in the reactor of about 10 minutes. The effluent from the reactor was delivered into a settling vessel in which a residue readily separated. After separation of the residue, the gasoline was bubbled through a water scrubber to remove dissolved boron trifluoride. The treated gasoline was then re-distilled to a cut point of 420° F. vapor temperature in a batch still to remove soluble polymers. Decomposition of the gasoline during the distillation was avoided by limiting the temperature in the bottom of the still to 300° F. and reducing the pressure on the still in order to obtain higher temperatures, corrected to 760 millimeters of mercury. The distillate gasoline was inhibited by the addition of du Pont No. 5 Anti-oxidant (a mixture containing 50 percent n-butyl-p-aminophenol, 20 percent methanol and 30 percent isopropanol) at the rate of 10 pounds (of active ingredient) per 1000 barrels of gasoline.

EXAMPLE 2

A sample of the same gasoline employed as charge stock in Example 1 was treated by the same process as described in Example 1 with the exception that the rate of addition of boron trifluoride was 0.10 percent by weight of charge.

EXAMPLE 3

A sample of the heavy fluid catalytically cracked gasoline employed as charge stock in Example 1 was treated by the addition of 96 percent sulfuric acid into the gasoline charged to the reactor at the rate of 0.05 percent by weight of the gasoline charged. Boron trifluoride was added to the gasoline in the reactor at the rate of 0.05 percent by weight of charge. The mixture was treated according to the method described in Example 1 with the exception that the treated gasoline was neutralized with caustic after water washing.

EXAMPLE 4

A sample of the same gasoline used as charge stock for Example 1 was agitated with 1.8 percent by weight of charge of 96 percent sulfuric acid. The treated gasoline was separated from the residue, water washed, neutralized and redistilled to a cut point of 420° F.

EXAMPLE 5

A sample of the same gasoline used as charge stock in the other examples was treated as described in Example 4 with the exception that the rate of addition was increased to 3.6 percent by weight of charge.

EXAMPLE 6

A sample of the same fluid catalytically cracked gasoline used as charge stock in the other examples was treated by the addition of sulfur trioxide at the rate of 0.04 percent by weight of charge to the stream of gasoline introduced into the reactor. Boron trifluoride was added to the reactor at the rate of 0.03 percent by weight of the charge. Following agitation in the reactor, the treated gasoline was settled to separate a residue, water washed, neutralized and re-distilled.

DuPont No. 5 Anti-oxidant was added to each of the re-distilled treated gasolines from Examples 2 through 6 at the same rate as in Example 1. A sample of the charge stock was re-distilled to a cut point of 420° F. and inhibited in the same manner as the other samples. Each of the inhibited gasolines, including the rerun charge stock, was then tested by several standard accelerated stability tests. The results of the tests are presented in Table I.

*Table I*

| Example | | 1 | 2 | 3 | 4 | 5 | 6 |
|---|---|---|---|---|---|---|---|
| Type of Operation | Return Charge | BF$_3$ | BF$_3$ | BF$_3$ and H$_2$SO$_4$ | H$_2$SO$_4$ | H$_2$SO$_4$ | BF$_3$ and SO$_3$ |
| BF$_3$ Rate, Percent by Weight of Charge | | 0.05 | 0.10 | 0.05 | | | 0.03 |
| Promoter Rate, Percent by Weight of Charge | | | | 0.05 | [1] 1.8 | [2] 3.6 | 0.04 |
| Yield of Treated Gasoline, Percent by Vol. of Charge (Rerun to 420° F.) | 94.9 | 95.3 | 94.8 | 94.5 | 94 | 93 | 94.2 |
| Inspections of Treated and Rerun Gasoline: | | | | | | | |
| Copper Dish Gum, Mg./100Ml. (ASTM D 910-51T) | 130 | 76 | 47 | 41 | 31 | 21 | 50 |
| Existent Gum, Mg./100 Ml. (ASTM D 318-50) | 9.5 | | 2.8 | 0.5 | 2.0 | 1.0 | 1.1 |
| Oxidation Stability: Min. (ASTM D 525-49) | 136 | 235 | 290 | 294 | 190 | 260 | 150 |
| GM Sludge No. | 132 | 91 | 73 | 79 | 110 | 88 | 92.1 |
| Storage Time at 150° F. at which Gum Content is 10 Mg./100 Ml., Hrs | 50 | | 125 | >255 | 105 | 170 | >242 |
| Storage Time at 100° F., at which Gum Content is 10 Mg./100 Ml., Days | 51 | 62 | 155 | >192 | | >225 | >219 |

[1] 5 lb. 96% H$_2$SO$_4$/bbl. charge.
[2] 10 lbs. 96% H$_2$SO$_4$/bbl. charge.

The re-distillation of the charge stock to a 420° F. cut point in the experimental work resulted in substantial losses from handling. The small difference in the yield obtained when the charge was merely rerun and when the charge was treated and rerun shows that the loss in yield resulting from treating is small.

It will be noticed from Table I that the treatment of the heavy fluid catalytic cracked gasoline with 0.05 percent boron trifluoride results in a gasoline in which 10 milligrams of gum per 100 milliliters of gasoline are present after 62 days in storage at 100° F. A gasoline having those chaaracteristics generally is not sufficiently stable for blending with other stocks in the preparation of a finished gasoline. (The presence of 10 mg. of gum/100 ml. after 62 days at 100° F. corresponds to a similar gum content after approximately 9 months at 80° F.) If the rate of addition of the boron trifluoride is increased to 0.1 percent by weight of charge, as in Example 2, the time of storage at 100° F. before 10 milligrams of gum per 100 milliliters of gasoline are present in the gasoline is increased to 155 days. There are also corresponding improvements in the copper dish gum, existent gum, oxidation stability and GM sludge number. Ordinarily, a heavy gasoline having the properties of the gasoline produced in Example 2 is suitable for blending with lighter fractions to form a finished gasoline.

If the gasoline is treated with 0.05 percent boron trifluoride promoted with 0.05 percent sulfuric acid, the time of storage at 100° F. before 10 milligrams of gum per 100 milliliters of gasoline are present in the gasoline is increased to more than 192 days. It is apparent that the sulfuric acid exerts a strong promoting effect upon the boron trifluoride. Similar promoting effects are obtained by the use of sulfur trioxide with boron trifluoride as a treating agent. The caustic neutralization of the gasolines treated with promoted $BF_3$ is not the cause of the improved stability. Caustic neutralization of gasolines treated with $BF_3$ alone resulted in no improvement in stability.

Even though the use of the relatively small amount of 0.1 percent of boron trifluoride as a treating agent will produce a gasoline having satisfactory stability, the high cost of boron trifluoride is important in the treating of the gasoline. This invention permits sulfuric acid which costs less than one-fifteenth as much as the boron trifluoride to be substituted for the boron trifluoride with an improvement in the stability of the gasoline. Similar savings may be obtained by promotion of boron trifluoride with sulfur trioxide.

This invention has been described in detail for the stabilization of heavy fluid catalytically cracked gasolines because those gasolines are usually the most unstable and difficult to stabilize gasolines. Other cracked gasolines, such as thermally cracked gasolines, gasolines cracked by other catalytic processes, or lighter fractions of such gasolines can also be stabilized by treatment according to this invention.

I claim:

1. A process for the stabilization of cracked gasoline comprising contacting gasoline with a mixture of boron trifluoride and a promoter selected from the group consisting of sulfuric acid and sulfur trioxide, the amount of $BF_3$ being about 0.05 percent by weight of the gasoline and the amount of promoter being about 0.05 percent, by weight, of the gasoline.

2. A process for the stabilization of cracked gasoline comprising contacting the gasoline with boron trifluoride promoted with a promoter selected from the group consisting of sulfuric acid and sulfur trioxide, the amount of promoter being about 0.05% by weight of the gasoline, and separating the gasoline from the residue formed during the contacting.

3. A process for the stabilization of cracked gasoline comprising contacting the gasoline with boron trifluoride promoted with a promoter selected from the group consisting of sulfuric acid and sulfur trioxide, the amount of the promoter being about 0.05% by weight of the gasoline, separating the gasoline from the residue formed in the cracking step, washing the separated gasoline with water, distilling the washed gasoline, and collecting the gasoline as a distillate product.

4. A process for the stabilization of cracked gasoline comprising contacting the gasoline with boron trifluoride promoted with sulfuric acid, the amount of sulfuric acid being about 0.05% by weight of the gasoline, and separating the gasoline from the residue formed during the contacting.

5. A process as set forth in claim 4 in which the concentration of the sulfuric acid is above about 87%.

6. A process for the stabilization of cracked gasoline comprising contacting the gasoline with boron trifluoride promoted with sulfur trioxide, the amount of sulfur trioxide being about 0.05% by weight of the gasoline and separating the gasoline from the residue formed during the contacting.

References Cited in the file of this patent

UNITED STATES PATENTS

| Number | Name | Date |
|---|---|---|
| 1,966,010 | Howes | July 10, 1934 |
| 1,992,308 | Hultman | Feb. 26, 1935 |
| 1,994,511 | Gary | Mar. 19, 1935 |
| 2,079,443 | Fulton | May 4, 1937 |
| 2,133,452 | Hewlett | Oct. 18, 1938 |
| 2,190,471 | Ellis | Feb. 13, 1940 |